3,108,027
PROPELLANT COMPOSITIONS
Lloyd H. Brown, Glendora, Calif., assignor to Aerojet-General Corporation, Azusa, Calif., a corporation of Ohio
No Drawing. Filed Mar. 22, 1954, Ser. No. 417,963
6 Claims. (Cl. 149—19)

This invention relates to a new series of burning rate catalysts for solid propellant composition.

Propellant compositions in use at the present time are composed essentially of two main components, namely, a resin fuel and an oxidizing material. It is desirable for many purposes, such as rocket propulsion, that a propellant burn rapidly and smokelessly.

Metal-containing oxidizers burn with the evolution of voluminous amounts of smoke due to the metal oxides formed. To avoid this, non-metal containing ammonium salts are commonly preferred as oxidizers; ammonium nitrate, due to its ease of handling, cost and availability, being the most desirable. Unfortunately, however, ammonium nitrate does not readily ignite or sustain combustion unless catalyzed. The most commonly used catalysts are metal-containing ammonium salts such as ammonium dichromate. These catalysts, although used in relatively small amounts, produce some smoke and only moderate burning rates, hence the dual objects of smokelessness and fast burning in propulsion operation are not satisfactorily met.

I have now found a new series of organic burning rate catalysts which burn in a completely smokeless manner and greatly augment the catalytic effect of conventional catalysts upon ammonium nitrate decomposition. The catalysts of this invention find valuable use both as supplements to and partial substitutes for burning rate catalysts such as ammonium dichromate. By employing these organic catalysts the amount of ammonium dichromate, and hence the smoke produced by the chromic oxide, may be reduced without impairing the burning rate of the propellant. In like manner by adding the organic catalyst to the usual catalytic amount of ammonium dichromate in a propellant composition, the burning rate of said composition is greatly increased without incurring additional smoke.

The organic compounds useful as catalysts in the present invention are amines and amides, namely, acetamide, benzamide, hexamethylenetetramine, nitramine guanidine, and 2-vinyl pyridine. These compounds are either solids at polymerization temperatures, normally about 70° C., or liquids such as 2-vinyl pyridine which polymerizes with the fuel to form a solid. They are usually employed in amounts of from about 0.5% to about 5% by weight of the composition.

These burning rate catalysts are particularly useful, although not necessarily limited in their use, in propellant compositions utilizing an alkyl resin type fuel. Such compositions are ordinarily composed of 3 principal ingredients; namely, an alkyd resin, an olefinic monomer and ammonium nitrate.

The alkyd resin is usually a polyester prepared by the condensation of a polycarboxylic acid with a polyhydric alcohol, one or both of which contain olefinic linkages. The unsaturation present in the ester is necessary to permit cross linking with the olefinic monomer. Among the unsaturated polycarboxylic acids which are ordinarily used in the preparation of such polyesters are maleic, fumaric, citraconic, mesaconic, itaconic acid, etc. Saturated acids found to be useful are such acids as oxalic, malonic, succinic and glutaric, etc. The polyhydric alcohols useful are dihydric alcohols such as ethylene glycol, propylene glycol, glycol, etc.; as well as trihydric alcohols such as glycerol; tetrahydric alcohols such as the erythritols; pentahydric alcohols such as arabitol, etc., or mixtures of any of these alcohols.

The olefinic component of the fuel may be, for example, styrene, vinyl acetate, acrylic acid esters, methacrylic acid esters, allyl compounds such as allyl diglycol carbonate, diallyl maleate, diallyl glycollate, and other unsaturated components such as propylene, butadiene, as well as the acetylenes. In addition derivatives of any of the above substances which are capable of polymerization with the resin may also be used. In general, any unsaturated compound compatible with the resin, and which will polymerize with it, is suitable; this includes all unsubstituted olefins and, in addition, many substituted olefins. The unsaturation present in the polyester permits it to polymerize with the double bond in the olefin, thus forming cross linkages. When a sufficient amount of cross linkage occurs the resin becomes thermosetting; with a lesser degree of cross linkage, the resin may be thermoplastic; and, in some cases, the resin possesses properties of both thermoplastic and thermosetting resins. All of these types are within the purview of the present invention.

The oxidizer is usually present in a finely divided condition dispersed through the fuel in amounts of about 50% to about 80% by weight of the total composition. Optimum results are obtained when there is sufficient oxygen in the propellant to oxidize all the carbon to carbon monoxide and one-third of the hydrogen to water.

The propellant grains are prepared by blending together the polyester and olefinic components of the fuel, the oxidizer and the burning rate catalyst. If desired, a suitable polymerization catalyst may also be added. The mixture is cast into a mold and the fuel allowed to polymerize at a temperature in the range of from about 25° C. to about 100° C., and preferably at a temperature below 60° C.

The polymerization catalysts usually employed are organic peroxides such as benzoyl peroxide, lauryl peroxide, acetobenzoyl peroxide, ditertiary butyl peroxide, methyl ethyl ketone peroxide, 1-hydroxy-cyclohexyl hydroperoxide, cumene hydroperoxide, cycloalkane hydrocarbon peroxide, and peresters such as tertiary butyl perbenzoate and diperphthalate.

Various ingredients may also be added for specific purposes without departing from the scope of the invention. For example, lecithin may be added to improve the castability of the uncured propellant.

The propellant grains prepared in the above described manner can withstand rough handling and will perform satisfactorily at temperatures in the range of from about −65° to about 165° F.

To illustrate the effect of the amine and amide catalysts of this invention upon the burning rate of propellants prepared as described above and thereby more clearly explaining the invention, the following examples are presented. It is to be understood, however, that these examples are presented merely as a means of illustration and are not intended to limit the scope of the invention in any way.

*Example I*

| Component | Propellant I, Wt. Percent | Propellant II, Wt. Percent |
|---|---|---|
| Burning Rate Catalyst: | | |
|    Ammonium Dichromate | 1.99 | 1.97 |
|    Acetamide | | 0.99 |
| Ammonium Nitrate | 72.61 | 71.89 |
| Polyester by wt. percent | 9.94 | 9.84 |
|    43.00% Diethylene glycol. | | |
|    44.25% Adipic acid. | | |
|    1.75% Maleic anhydride. | | |
| Styrene | 2.48 | 2.45 |
| Methyl Acrylate | 12.43 | 12.31 |
| Methyl Amyl Ketone Peroxide and Lecithin | 0.55 | 0.55 |
| | 100.00 | 100.00 |

The respective burning rates of the above propellants were determined in a Crawford bomb at a pressure of 1000 p.s.i.a. and at a temperature of 60° F., and found to be:

Propellant:     Burning rate, 1000 p.s.i.a., 60° F., in./sec.⁻¹
I _____ 0.074
II _____ 0.100

As can be seen, 0.99% acetamide increased the burning rate 48.64%.

*Example II*

| Component | Propellant I, Wt. Percent | Propellant II, Wt. Percent |
|---|---|---|
| Burning Rate Catalyst: | | |
|    Ammonium Dichromate | 2.00 | 1.98 |
|    Hexamethylenetetramine | | 0.99 |
| Ammonium Nitrate | 76.00 | 75.25 |
| Polyester by wt. percent | 5.86 | 5.88 |
|    43.00% Diethylene glycol. | | |
|    44.25% Adipic acid. | | |
|    1.75% Maleic anhydride. | | |
| Methyl Acrylate | 7.94 | 7.95 |
| Styrene | 7.94 | 7.95 |
| Methyl Amyl Ketone Peroxide and Lecithin | 0.26 | |
| | 100.00 | 100.00 |

The propellants were cured at a temperature of 110° F. for two days and then at a temperature of 140° F. for two days. The burning rates of the propellants were determined in a Crawford bomb at a pressure of 1000 p.s.i.a. and at a temperature of 60° F.

Propellant:     Burning rate, 1000 p.s.i.a., 60° F., in./sec.⁻¹
I _____ 0.074
II _____ 0.0864

Hexamethyltetramine in an amount of 0.99% increased the burning rate 15.4%.

*Example III*

| Component | Propellant I, Wt. Percent | Propellant II, Wt. Percent |
|---|---|---|
| Burning Rate Catalyst: | | |
|    Ammonium Dichromate | 2.00 | 2.00 |
|    2-Vinyl Pyridine | | 3.97 |
| Ammonium Nitrate | 76.00 | 76.00 |
| Polyester by wt. percent | 5.86 | 5.86 |
|    43.00% Diethylene glycol. | | |
|    44.25% Adipic acid. | | |
|    1.75% Maleic anhydride. | | |
| Styrene | 7.94 | 3.97 |
| Methyl Acrylate | 7.94 | 7.94 |
| Methyl Amyl Ketone Peroxide and Lecithin | 0.26 | 0.26 |
| | 100.00 | 100.00 |

The respective burning rates of the propellants were determined in a Crawford bomb at 60° F. and are as follows:

| Pressure, p.s.i.a. in Bomb | Burning Rate, in./sec.⁻¹ | |
|---|---|---|
| | Propellant I | Propellant II |
| 1,000 | 0.072 | 0.11 |
| 1,500 | 0.093 | 0.13 |

2-vinyl pyridine in an amount of 3.97% increased the burning rate 52.6% at a pressure of 1000 p.s.i.a. and 39.77% at a pressure of 1500 p.s.i.a.

*Example IV*

The following typical additives, nitramine guanidine and benzamide, were added in amounts of 1 weight percent to compositions having the following formulation:

Component:     Wt. percent
Burning rate catalyst—Ammonium dichromate _____ 2.00
Ammonium nitrate _____ 76.13
Polyester by wt. percent _____ 5.87
   43.00% diethylene glycol
   44.25% adipic acid
   1.75% maleic anhydride
Styrene _____ 7.95
Methyl acrylate _____ 7.95
Methyl amyl ketone peroxide and lecithin __ 0.10
                                                        100.00

The burning rates for these propellants were determined with 2-inch propellant strands in a Crawford bomb, at a pressure of 1000 p.s.i.a. and a temperature of 60° F.

1% additive:     Burning rate, R=1000 p.s.i.a., 60° F., in./sec.⁻¹
Nitramine guanidine _____ 0.0880
Benzamide _____ 0.0794

Nitramine guanidine in an amount of 1% increased the burning rate 22.22% and benzamide in an amount of 1% increased the burning rate 10.25%.

The use of amine and amide additives is not limited by the particular fuel components contained in the propellant. Polymers of polynitro alkenes, nitro-containing acids and nitro-containing esters, as well as other readily combustible polymeric materials may be used without departing from the scope of the invention.

In view of the substantial increases in burning rates effected by the catalysts of this invention, without the production of highly undesirable smoke, it is apparent that these catalysts will find wide application in the production of solid propellants.

I claim:
1. A solid propellant composition consisting essentially of from about 50% to about 80% by weight of the total propellant composition of ammonium nitrate; an unsaturated polyester resin consisting of the condensation product of saturated polyhydric alcohol and polycarboxylic acid heteropolymerized with an unsaturated compound selected from the group consisting of lower alkenes, lower alkynes, phenyl substituted lower alkenes, lower alkyl dienes, lower alkenyl esters of lower akenoic acids, lower alkenyl esters of lower alkanoic acids, lower alkyl esters of lower alkenoic acids, allyl diglycol carbonate, diallyl diglycollate and mixtures thereof; and a burning rate acceleration catalyst consisting of a mixture of about 2% by weight of ammonium dichromate and a compound selected from the group consisting of acetamide, benzamide, hexamethylenetetramine, nitramine guanidine, and 2-vinyl pyridine, in an amount of from about 0.5% to about 5.0% by weight of the total propellant composition.

2. A solid propellant composition consisting essentially of a cured intimate mixture of from about 50% to about 80% by weight of the total propellant composition of ammonium nitrate; an unsaturated polyester resin consisting of the condensation product of diethylene glycol, adipic acid and maleic anhydride heteropolymerized with a mixture of styrene and methyl acrylate; about 2% by weight of ammonium dichromate; and about 1% by weight of acetamide.

3. A solid propellant composition consisting essentially of a cured intimate mixture of from about 50% to about 80% by weight of the total propellant composition of ammonium nitrate; an unsaturated polyester resin consisting of the condensation product of diethylene glycol, adipic acid and maleic anhydride heteropolymerized with a mixture of styrene and methyl acrylate; about 2% by weight of ammonium dichromate; and about 1% by weight benzamide.

4. A solid propellant composition consisting essentially of a cured intimate mixture of from about 50% to about 80% by weight of the total propellant composition of ammonium nitrate; an unsaturated polyester resin consisting of the condensation product of diethylene glycol, adipic acid and maleic anhydride heteropolymerized with a mixture of styrene and methyl acrylate; about 2% by weight of ammonium dichromate; and about 1% by weight hexamethylenetetramine.

5. A solid propellant composition consisting essentially of a cured intimate mixture of from about 50% to about 80% by weight of the total propellant composition of ammonium nitrate; an unsaturated polyester resin consisting of the condensation product of diethylene glycol, adipic acid and maleic anhydride heteropolymerized with a mixture of styrene and methyl acrylate; about 2% by weight of ammonium dichromate; and about 1% by weight nitramine guanidine.

6. A solid propellant composition consisting essentially of a cured intimate mixture of from about 50% to about 80% by weight of the total propellant composition of ammonium nitrate; an unsaturated polyester resin consisting of the condensation product of diethylene glycol, adipic acid and maleic anhydride heteropolymerized with a mixture of styrene and methyl acrylate; about 2% by weight of ammonium dichromate; and about 4% by weight of 2-vinyl pyridine.

References Cited in the file of this patent

UNITED STATES PATENTS

| | | |
|---|---|---|
| 2,388,319 | Fuller | Nov. 6, 1945 |
| 2,434,872 | Taylor et al. | Jan. 20, 1948 |
| 2,472,963 | Singleton et al. | June 14, 1949 |
| 2,479,828 | Geckler | Aug. 23, 1949 |

FOREIGN PATENTS

| | | |
|---|---|---|
| 579,057 | Great Britain | July 22, 1946 |

OTHER REFERENCES

Hackh's Chemical Dictionary, 3d edition, The Blakiston Co., Philadelphia, page 593.